United States Patent
Wang et al.

(10) Patent No.: US 11,288,483 B2
(45) Date of Patent: Mar. 29, 2022

(54) FINGERPRINT RECOGNITION DEVICE, FINGERPRINT RECOGNITION METHOD, AND DISPLAY DEVICE

(71) Applicant: BOE TECHNOLOGY GROUP CO., LTD., Beijing (CN)

(72) Inventors: Lei Wang, Beijing (CN); Haisheng Wang, Beijing (CN); Yingming Liu, Beijing (CN); Changfeng Li, Beijing (CN); Rui Xu, Beijing (CN)

(73) Assignee: BOE TECHNOLOGY GROUP CO., LTD., Beijin (CN)

( * ) Notice: Subject to any disclaimer, the term of this patent is extended or adjusted under 35 U.S.C. 154(b) by 490 days.

(21) Appl. No.: 16/331,364

(22) PCT Filed: Jul. 27, 2018

(86) PCT No.: PCT/CN2018/097481
§ 371 (c)(1),
(2) Date: Mar. 7, 2019

(87) PCT Pub. No.: WO2019/114276
PCT Pub. Date: Jun. 20, 2019

(65) Prior Publication Data
US 2021/0334497 A1    Oct. 28, 2021

(30) Foreign Application Priority Data

Dec. 15, 2017   (CN) .......................... 201711351778.7

(51) Int. Cl.
*G06K 9/00*   (2006.01)
*G06F 3/041*   (2006.01)
*G06F 3/042*   (2006.01)

(52) U.S. Cl.
CPC ......... *G06K 9/0004* (2013.01); *G06F 3/0412* (2013.01); *G06F 3/0421* (2013.01);
(Continued)

(58) Field of Classification Search
CPC ............. G06K 9/0004; G06K 9/00053; G06K 9/00033; G06F 3/0421; G06F 3/0412; G06F 3/04184
See application file for complete search history.

(56) References Cited

U.S. PATENT DOCUMENTS 9,710,689 B2   7/2017 Evans, V et al.
10,361,255 B2   7/2019 Zeng et al.
(Continued)

FOREIGN PATENT DOCUMENTS

CN   106249457 A   12/2016
CN   106709455 A   5/2017
(Continued)

OTHER PUBLICATIONS

Office Action, dated Nov. 7, 2018, issued in counterpad Chinese Application No. 201711351778.7 (13 pages; w/English machine translation).
(Continued)

*Primary Examiner* — Premal R Patel
(74) *Attorney, Agent, or Firm* — WHDA, LLP

(57) ABSTRACT

The present disclosure generally relates to the field of display technology, and in particular to a fingerprint recognition device and a display device having the fingerprint recognition device. A fingerprint recognition device includes a substrate; a plurality of point light sources on the substrate, which are configured to emit light; a plurality of light sensors on the substrate, which are configured to generate an electrical signal based on the light emitted from the plurality of point light sources and reflected from a touch surface, and a display layer on the plurality of light sensors.

18 Claims, 18 Drawing Sheets

(52) U.S. Cl.
CPC ..... G06F 3/04184 (2019.05); G06K 9/00033 (2013.01); G06K 9/00053 (2013.01)

(56) References Cited

U.S. PATENT DOCUMENTS

| | | | |
|---|---|---|---|
| 2016/0041663 A1* | 2/2016 | Chen | G06F 3/0443 345/174 |
| 2016/0162096 A1* | 6/2016 | Hao | H01L 27/3262 345/174 |
| 2017/0090102 A1* | 3/2017 | Holman | G02B 6/0061 |
| 2017/0124370 A1 | 5/2017 | He et al. | |
| 2017/0270342 A1* | 9/2017 | He | G06F 21/32 |
| 2017/0323144 A1* | 11/2017 | Wu | G06K 9/00046 |
| 2017/0337413 A1* | 11/2017 | Bhat | G06K 9/00087 |
| 2018/0033835 A1 | 2/2018 | Zeng et al. | |
| 2018/0039849 A1* | 2/2018 | You | G06K 9/46 |

FOREIGN PATENT DOCUMENTS

| | | |
|---|---|---|
| CN | 107038434 A | 8/2017 |
| CN | 107145868 A | 9/2017 |
| CN | 107230698 A | 10/2017 |
| CN | 107430682 A | 12/2017 |
| CN | 107832752 A | 3/2018 |
| WO | 2007071572 A1 | 6/2007 |
| WO | 2017076292 A1 | 5/2017 |
| WO | 2019114276 A1 | 6/2019 |

OTHER PUBLICATIONS

Search Report and Written Opinion, dated Nov. 7, 2018, issued in counterpart International Application No. PCT/CN2018/097481 (10 pages; in English).

Office Action, dated Jun. 1, 2020, issued in counterpart Chinese Application No. 20171 1351778.7 (w/ English machine translation; 12 pages).

* cited by examiner

FINGERPRINT RECOGNITION DEVICE, FINGERPRINT RECOGNITION METHOD, AND DISPLAY DEVICE

CROSS-REFERENCE TO RELATED APPLICATIONS

This application claims the benefit of the filing date of Chinese Patent Application 201711351778.7 filed on Dec. 15, 2017, the entire disclosure of which is hereby incorporated by reference.

TECHNICAL FIELD

The present disclosure generally relates to the field of display technology, and more particularly, to a fingerprint recognition device and a display device having the fingerprint recognition device. The present disclosure also relates to a fingerprint recognition method, and more particularly, to an in-display, full-screen fingerprint recognition method, for example, for a display device.

BACKGROUND

A fingerprint is the pattern of protrusions (ridges) and depressions (valleys) on an epidermal layer of a finger. Fingerprints are unvarying, unique, and portable, and as such, fingerprints have wide applications in biometric recognition, and in particular, in the field of authentication.

BRIEF SUMMARY embodiment of the present disclosure is a fingerprint recognition device. The fingerprint recognition device may comprise a substrate; a plurality of point light sources on the substrate, which are configured to emit light; a plurality of light sensors on the substrate, which are configured to generate an electrical signal based on the light emitted from the plurality of point light sources and reflected from a touch surface; and a display layer on the plurality of light sensors.)

In at least some embodiments, the plurality of point light sources and the plurality of light sensors may be on opposite sides of the substrate, with the plurality of light sensors being on a display side of the substrate.

In at least some embodiments, the plurality of point light sources and the plurality of light sensors may be on a display side of the substrate.

In at least some embodiments, the fingerprint recognition device may further comprise a light shielding layer on a side of the plurality of the light sensor facing the at least one point light source.

In at least some embodiments, the plurality of point light sources may be arranged in an array.

In at least some embodiments, wherein a distance between a pair of adjacent point light sources satisfies a relationship defined by formula (I):

$$p \leq \frac{d\tan\theta_1}{\sqrt{2}}, \quad (1)$$

in which p is the distance between the pair of adjacent point light sources, d is the distance between a first of the pair of point light sources and the imaging surface, and $\theta_1$ is the maximum divergence angle of light that is emitted by the first of the pair of point light sources and that is detectable by one of the plurality of light sensors.

In at least some embodiments, the fingerprint recognition device may further comprise a touch layer on the display layer. The touch layer may be configured to determine a position of contact between the finger of the user and the imaging surface, and when a contact is detected, the touch layer may be configured to determine the position of the contact, so that a display is not generated in a portion of the display layer corresponding to the position of the contact.

In at least some embodiments, the fingerprint recognition device may further comprise a touch layer on the light sensor, and a backlight on the touch layer. The touch layer may be configured to determine a position of contact between the finger of the user and the touch surface, and when a contact is detected, the touch layer may be configured to determine the position of the contact, so that the backlight is turned off at the position of the contact.

In at least some embodiments, each of the plurality of point light sources may comprise a light source and a pinhole layer on the light source. The pinhole layer may comprise a pinhole array. In at least some embodiments, each pinhole in the pinhole array may be tapered.

In at least some embodiment, the pinhole layer may comprise a reflective coating layer. The reflective coating layer may be at least one selected from (i) a metal layer comprising a metal having a high reflectivity and (ii) a dielectric layer comprising a low refractive layer and a high refractive layer arranged in an alternating manner.

In at least some embodiments, each of the plurality of point light sources may comprise a plurality of light emitting devices arranged in an array. Each of the plurality of light emitting devices may be one, selected from the group consisting of OLED, LED, and MicroLED.

In at least some embodiments, the plurality of point light sources may be configured to illuminate according to a predetermined illumination sequence.

One embodiment of the present disclosure is an organic light-emitting diode (OLED) device for fingerprint recognition. The OLED device may comprise a point light source layer comprising at least one point light source configured to emit light, an array substrate, a first electrode, a light emitting layer, a second electrode, and a protective layer, arranged in the stated order. The light emitting layer may comprise a plurality of light sensors configured to generate an electric signal based on the light emitted from the plurality of point light sources and reflected from a touch surface of the OLEO device.

One embodiment of the present disclosure is a display device. The display device may comprise the fingerprint recognition device as described above. The display device may comprise the OLED device as described above. On embodiment of the present disclosure is a fingerprint recognition method using the fingerprint recognition device as described above. The method may comprise detecting a contact by a user on the touch surface, causing the plurality of point light sources to emit a light toward the touch surface at a position of the contact, detecting a light reflected from the touch surface at the position of the contact, and generating an image of the fingerprint of the user based on the detected light.

In at least some embodiments, the method may further comprise turning off a backlight at the position of the contact.

In at least some embodiments, the method may further comprise turning off a display in the portion of the display layer corresponding to the position of the contact.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

Figure 1:
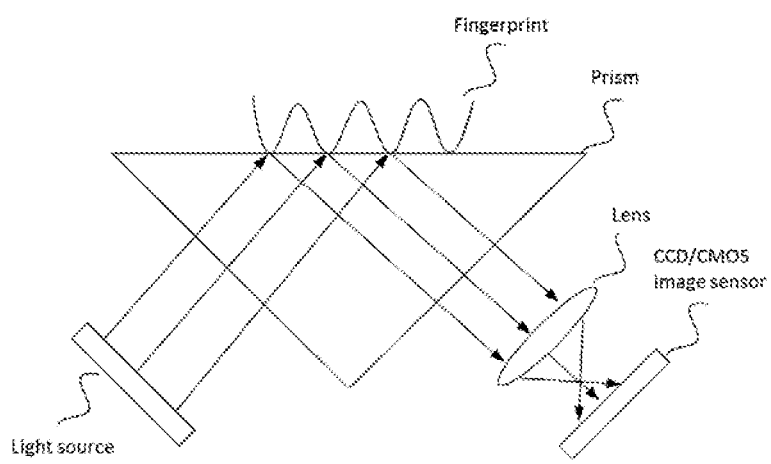
FIGS. 1-3 show schematic diagrams of conventional fingerprint recognition devices.

The various features of the drawings are not to scale as the illustrations are for clarity in facilitating one skilled in the art in understanding the invention in conjunction with the detailed description.

DETAILED DESCRIPTION

Next, the embodiments of the present disclosure will be described clearly and concretely in conjunction with the accompanying drawings, which are described briefly above. The subject matter of the present disclosure is described with specificity to meet statutory requirements. However, the description itself is not intended to limit the scope of this disclosure. Rather, the inventors contemplate that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiments for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

A fingerprint is the pattern of protrusions (ridges) and depressions (valleys) on an epidermal layer of a finger. Fingerprints are unvarying, unique, and portable, and as such, fingerprints have wide applications in biometric recognition, particularly, in the field of authentication.

The sensing technology integrated into existing fingerprint recognition methods typically falls into one of three categories: capacitive, optical, and ultrasonic. Fingerprint scanners incorporated in a display device for example, the display for an electronic device) commonly utilize capacitive sensors. When a finger touches the capacitive electrodes arranged in an array in the fingerprint scanner, the protruded ridges in the fingerprint make direct contact with the electrodes, while the depressed valleys are far away from the electrodes. These differences generate different capacitance measurements. Fingerprint information of the user is subsequently generated by converting the signals from the capacitive sensor into image data, and fingerprint authentication can then be performed.

In conventional electronic devices, the terminal (for example, the scanner) for the fingerprint recognition device is usually located outside the display area of a screen (for example, on a home button located in the non-display area of the screen). Such a configuration not only breaks up the screen space, but is also not compatible with the more recently developed display technologies that utilize borderless, or minimally bordered, screens. As a result, there is a demand not only for in-display fingerprint scanners, whether as a fitly-screen or a half-screen application, but also for high-definition fingerprint recognition.

The present disclosure provides a fingerprint recognition device that includes at least one point light source and a light sensor provided on a substrate. The at least one point light source is configured to emit light. The emitted light is reflected by a user's finger surface. The light sensor is configured to detect and process the reflected light to generate fingerprint information, which can be subsequently used to generate an image of the user's fingerprint. The configuration of the fingerprint recognition device according to the present disclosure makes it possible to increase the intensity of the light emitted by the light source. Further, the present disclosure provides a fingerprint recognition device that includes a light sensor in the display layer of the device. This configuration makes it possible to increase the transmittance of the light emitted by the light source, which enables high-definition fingerprint imaging.

Conventional optical sensors for acquiring fingerprints generally adopt one of three main technologies. The first is frustrated total internal reflection (FTIR), for example, as shown in FIG. 1. This is the oldest and most commonly used live-scan acquisition technique. The surface of a prism is illuminated in a manner so that light is subject to total internal reflection when there is no skin contact with the prism. However, when there is contact, the total internal reflection is "frustrated" by the reduced refractive index mismatch, which enables the imaging of the fingerprint with enhanced dependence on the presence of the ridges and valleys of real fingerprints. The FTIR technique is known to produce superior image quality and large sensing areas. However, the technique is not without drawbacks, which include the typically bulky equipment necessary to perform imaging. The equipment cannot be miniaturized, effectively precluding the use of the technique in portable electronic devices, such as mobile phones.

Figure 2:
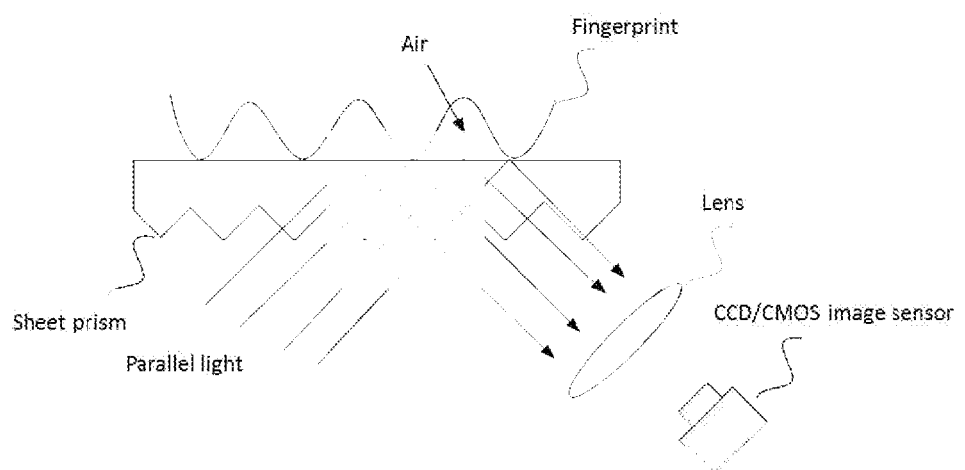

The second technique replaces the prism in the FUR technique with a sheet prism, for example, as shown in FIG. 2. Instead of a single large prism, this second technique uses a sheet prism made of a number of "prismlets" arranged adjacent to each other. However, even though the use of a sheet prism greatly reduces the bulkiness of the fingerprint scanner, the technique requires a specific directionality in the light emitted by the light source, which prevents the scanner from being arranged underneath the screen of a display device.

Figure 3:
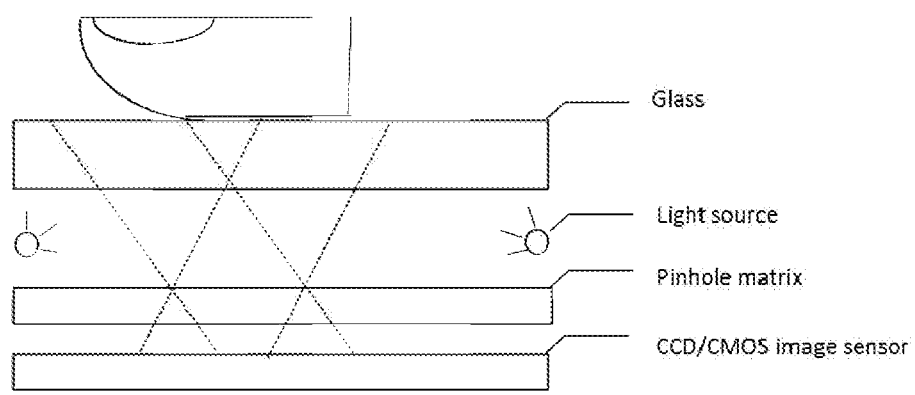

The third technique uses a matrix pinhole imaging system (MAPIS), which involves the use of a thin film formed with an array of pinholes in place of a prism, for example, as shown in FIG. 3. The sensor can be integrated directly underneath the cover glass of the screen of a display device. However, this technique is also not without drawbacks. For example, the sensor used in MAPIS technology requires a very high pixel density as measured by pixels-per-inch (PPI), so that its use is typically limited to a small area and is not suitable for a full-screen application.

Figure 4:
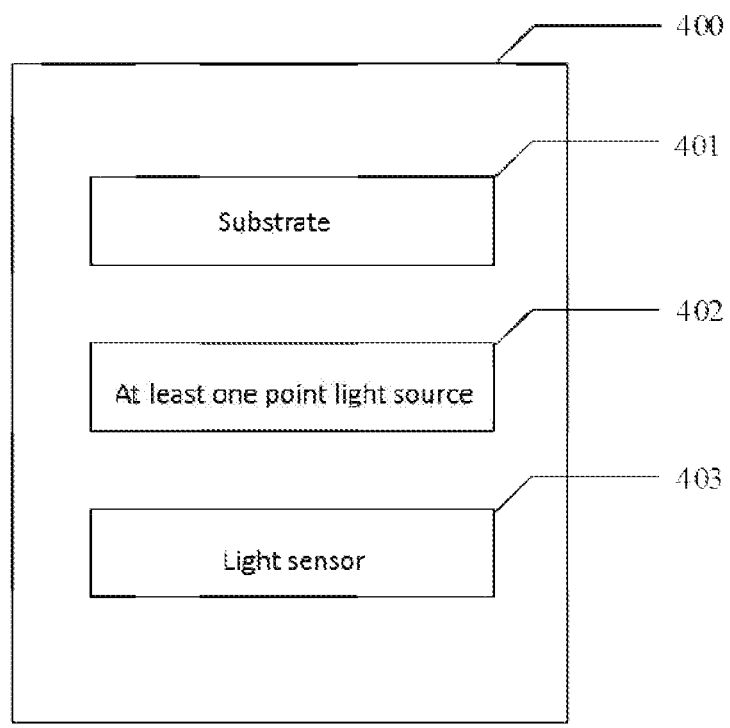
FIGS. 4-5 show schematic diagrams of a fingerprint recognition device according to embodiments of the present disclosure.

In view of the above problems associated with the conventional technologies, the present disclosure provides a fingerprint recognition device. FIG. 4 shows a schematic diagram of a fingerprint recognition device according to an embodiment of the present disclosure. As shown in FIG. 4, the fingerprint recognition device 400 includes a substrate 401, at least one point light source 402, and a light sensor 403.

The at least one point light source 402 is provided on the substrate 401, and is configured to emit light. When a user's finger is in contact with the touch surface (for example, the screen of a display panel incorporating the fingerprint recognition device 400), light emitted by the at least one point light source 402 is reflected at the touch surface back to the fingerprint recognition device 400. In some embodiments, the at least one point light source 402 is provided inside the fingerprint recognition device 400. In other embodiments, the at least one point light source 402 is provided outside the fingerprint recognition device 400. The light sensor 403 is provided on the substrate 401, and is configured to receive and process the light reflected by the user's finger to generate fingerprint information that can subsequently be used to build an image of the user's fingerprint. In at least some embodiments, the light sensor 403 is provided on a side of the at least one point light source 402 opposite from the substrate 401. In some embodiments, the light sensor 403 and the at least one point light source 402 are provided on opposite sides of the substrate, and more particularly, the light sensor 403 is on a display (i.e., viewer) side of the substrate 401.

The fingerprint recognition device 400 includes at least one point light source 402 to emit light, which is subsequently reflected at the touch surface. The light sensor 403 then receives and processes the reflected light to generate information about the user's fingerprint. The features of the present disclosure advantageously increase overall transmittance of the emitted light from the at least one point light source, which in turn enables high-definition fingerprint imaging. Further, the present disclosure enables the fingerprint recognition device to be integrated into a display device to achieve in-display, full-screen fingerprint recognition capability. By providing the light sensor inside the fingerprint recognition device, the present disclosure is able to miniaturize the size of the device, so as to improve the integrability of the device. Further still, the present disclosure simplifies the construction of the fingerprint recognition device, which in turn reduces manufacturing costs while increasing manufacturing efficiency.

Figure 5:
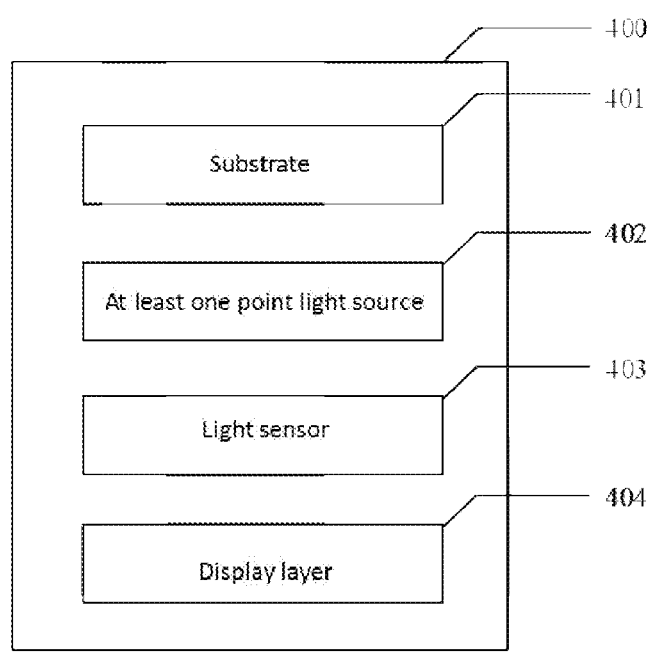

FIG. 5 shows a schematic diagram of a fingerprint recognition device according to another embodiment of the present disclosure. As shown in FIG. 5, the fingerprint recognition device 400 includes a substrate 401, at least one point light source 402, a light sensor 403, and a display layer 404. In some embodiments, the at least one point light source 402 may be provided inside or outside the fingerprint recognition device 400. When the at least one point light source 402 is provided outside the fingerprint recognition device 400, the at least one point light source 402 may be provided directly below the fingerprint recognition device 400, for example, on a side of the substrate 401 directly opposite from the light sensor 403 and the display layer 404. The light sensor 403 and the display layer 404 may be provided on the same side of the substrate 401. The at least one point light source 402 may be provided on a side of the substrate 401 opposite from the light sensor 403, so that the light sensor 403 is on the viewer side of the substrate 401. This configuration can improve the overall transmittance of the light emitted from the at least one point light source 402 and increase the resolution of the fingerprint imaging.

In at least some embodiments, the fingerprint recognition device 400 comprises a plurality of point light sources 402. The plurality of point light sources 402 may be arranged in an array.

In theory, light reflected by the ridges of a fingerprint has the same intensity as light reflected by the valleys of the fingerprint. However, a layer of air exists between the valleys and the touch surface. When the angle of light emitted from the point light source reaches or exceeds the total reflection angle θc, 100% of the light that reaches the valleys of the fingerprint will be reflected. Light reflected back by the valleys of the Fingerprint is stronger when the angle is equal to or greater than the total reflection angle θc. By limiting the effective illumination range of the divergence angle to equal to or greater than θc, the present disclosure is able to use the light emitted by the point light sources efficiently.

Figure 6:
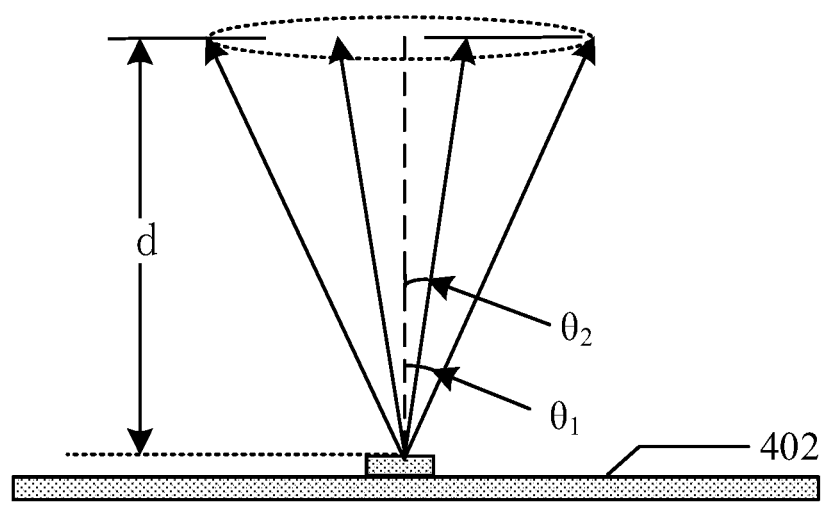
FIG. 6 shows a diagram illustrating the illumination area of light emitted by an array of point light sources according to an embodiment of the present disclosure.

FIG. 6 illustrates the illumination area of light emitted from the point light source array onto the finger surface. As shown in FIG. 6, the point light source array emits a light beam with a substantially circular cross-section, and the maximum divergence angle θ1 defines the "illumination area" of the light beam within which the light beam, when reflected at the touch surface (for example, the screen of a display device incorporating the fingerprint recognition device) is detectable by the light sensor of the fingerprint recognition device. More particularly, light outside the maximum divergence angle θ1 cannot be detected by the light sensor. Light intensity decreases with increasing divergence angle. Divergence measures the increase in the radius or diameter of the illumination area as a function of distance from the optical aperture as the light emerges. Due to the inverse relationship between light intensity and divergence angle, fingerprint: information cannot be captured effectively at every point within the illumination area as defined by the maximum divergence angle θ1. As shown in FIG. 6, a light beam having a divergence angle of θ2 demarcates the region within the illumination area where fingerprint information cannot be effectively captured. Within the total reflection angle θc, the reflectivity from the valleys of a fingerprint (and not the touch surface) is only 4%. When the point light source does not generate light having sufficient initial brightness, 4% of the reflected light cannot be detected by the light sensor, so that the total reflection angle θc will also demarcate the region of the illumination area within which fingerprint information cannot be effectively captured, that is, the "null region", in this case, the region defined by θ2 in FIG. 6 is θc. When the point light source does generate light having sufficient initial brightness that the light sensor is able to detect the 4% reflected light, the boundary of the null region will shrink, that is, in this case, the divergence angle θ2 in FIG. 6 becomes smaller than θc. However, point light source is subject to size constraints, so that an illumination area of light from the point light source will always have a null region in the center of the illumination area. Therefore, the effective region of the illumination area within which fingerprint information can be captured, that is, the "acquisition region," is the area between divergence angles θ2 and θ1, as shown in FIG. 6. By limiting the effective illumination range, of the divergence angle to equal to or greater than θc, the present disclosure is able to use the light emitted by the point light sources efficiently.

Figure 7:
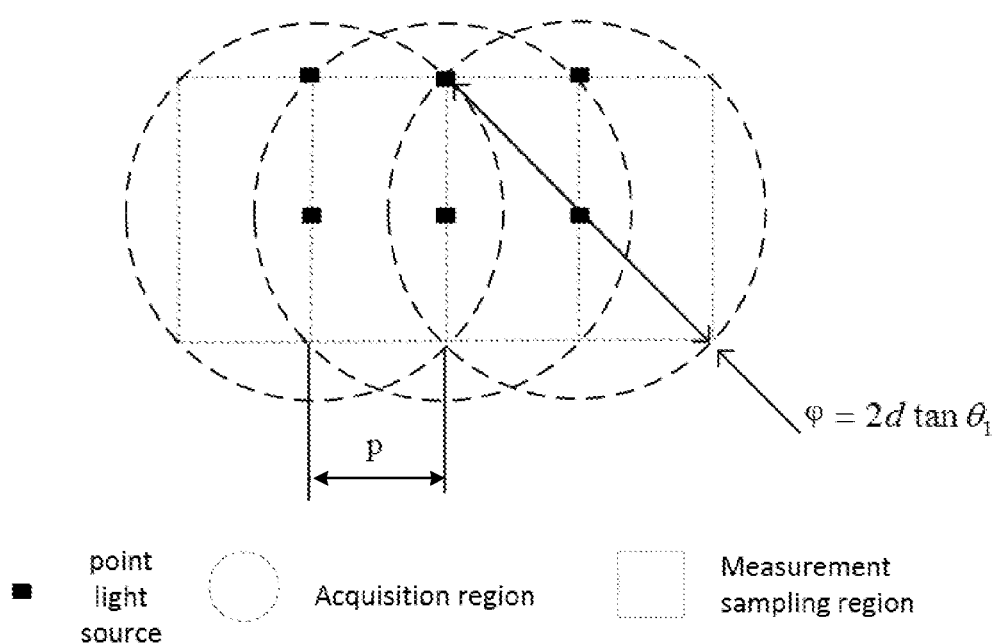
FIG. 7 shows a schematic diagram of an array of point light sources according to an embodiment of the present disclosure.

FIG. 7 shows a schematic diagram of an array of point light sources according to an embodiment of the present disclosure. As shown in FIG. 7, the light emitted by a point light source projects a substantially circular illumination area onto the imaging surface, with the point light source located at the center of the illumination area. The null region of the illumination field is located within the illumination area, and within the null region, fingerprint information cannot be effectively acquired. The area between the null region and the outer boundaries of the illumination area is the acquisition region, and within the acquisition region, fingerprint information can be effectively acquired.

In the fingerprint recognition device according to the present disclosure, the acquisition region of the illumination area of a point light source overlaps the null region of the illumination area of an adjacent point light source. Assuming that θ1 is the maximum divergence angle of light emitted by the point light source, and d is the distance between the point light source and the imaging surface, then the distance p between two adjacent point light sources in the array satisfies the relationship defined by formula (1):

$$p \le \frac{d\tan\theta_1}{\sqrt{2}} \quad (1)$$

According to the present disclosure, the acquisition region of the illumination area of a point light source overlaps the null region of illumination area of an adjacent point light source. This configuration has been found to advantageously improve the precision and efficiency of fingerprint identification.

Figure 8A:
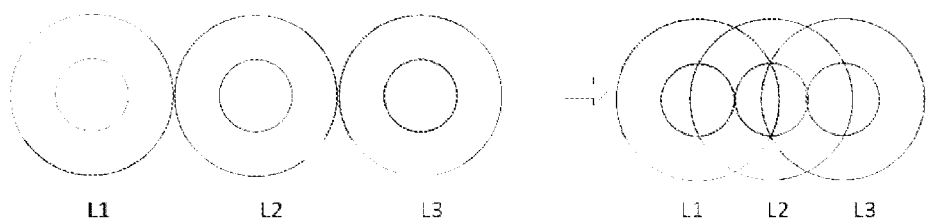
FIG. 8A shows a schematic diagram of an array of three (3) point light sources according to an embodiment of the present disclosure.
Figure 8B:
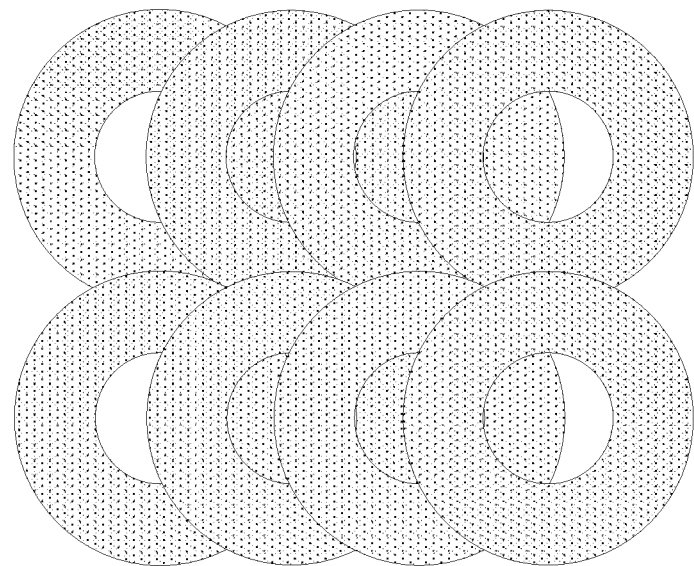
FIG. 8B shows a schematic diagram of an array of eight (8) point light sources according to an embodiment of the present disclosure.

FIG. 8A shows a schematic diagram of an array of three (3) point light sources according to an embodiment of the present disclosure. As shown in FIG. 8A, each of the three point light sources L1, L2, L3 has a corresponding circular illumination area. The acquisition region of the illumination area of L2 overlaps the null region of the illumination fields of L1 and L3. The acquisition regions of the illumination areas of L1 and L3 overlap the null region of the illumination area of L2. FIG. 8A shows a schematic diagram of an array of eight (8) point light sources according to an embodiment of the present disclosure. As shown in FIG. 8B, the acquisition region of the illumination field of a point light source overlaps the null region of the illumination field of an adjacent point light source.

In at least some embodiments comprising a plurality of point light sources, the plurality of point light sources are programmable, so that the illumination sequence (for example, order, timing, and/or duration of illumination) of the plurality of point light sources can be controlled according to a pre-programmed or user-defined sequence. The plurality of point light sources may be configured to emit light according to the pre-programmed sequence or the user-defined sequence. This programmable configuration makes it possible to reduce interference between light sensors due to simultaneous emissions from point light sources.

Figure 9:
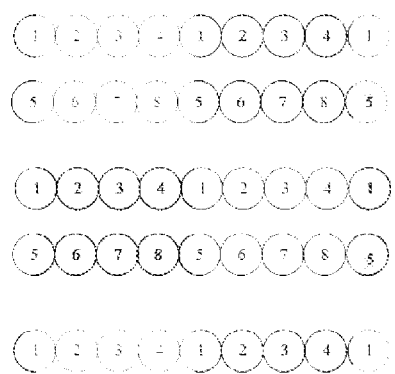
FIG. 9 shows a schematic diagram illustrating programmable sequential illumination of an array of point light sources according to an embodiment of the present disclosure.

A fingerprint recognition device according to an embodiment of the present disclosure is shown in FIG. 9. The fingerprint recognition device comprises a plurality of point light sources arranged in an array. As shown in FIG. 9, the plurality of point light sources in the array are numbered sequentially from 1 to 8. More particularly, point light sources in odd-numbered rows are divided into repeating units of four point light sources, and the point light sources in each repeating unit are numbered sequentially from 1 to 4. Point light sources in even-numbered rows are grouped into repeating units of four point light sources, and the point light sources in each repeating unit are numbered sequentially from 5 to 8. The plurality of point light sources are configured so that point light sources numbered 1 illuminate concurrently, followed by point light sources numbered 2, and so on, until point light sources numbered 8 have illuminated. Lights emitted by the point light sources during each illumination are reflected by the portion of the user's finger Hiring the emitting point light sources, and are received and processed by the corresponding light sensors to generate a fingerprint image.

Image data generated by light sensors following the sequential illuminations of the plurality of point light sources are compiled to build a composite image of the user's fingerprint. In some embodiments, the fingerprint recognition device may include an external light source to increase optical power.

It should be appreciated that changes could be made to the embodiments described above without departing from the inventive concepts thereof. It should be understood, therefore, that the plurality of point light sources in an array may be configured to illuminate according to any order depending on need, and is not limited to the particular embodiment disclosed above. For example, the array of point light sources may be grouped according to any suitable patterns of repeating units, and point light sources within the same repeating unit need not be aligned horizontally and/or vertically. Point light sources in repeating units may be configured to illuminate sequentially in a horizontal direction, a vertical direction, a diagonal direction, and/or any suitable direction of the array. It should be understood that the embodiments disclosed above are intended to cover modifications within the spirit and scope of the present invention.

A fingerprint recognition device according to the present disclosure may be integrated into an OLED device, a LED device, or a LCD device.

Figure 10A:
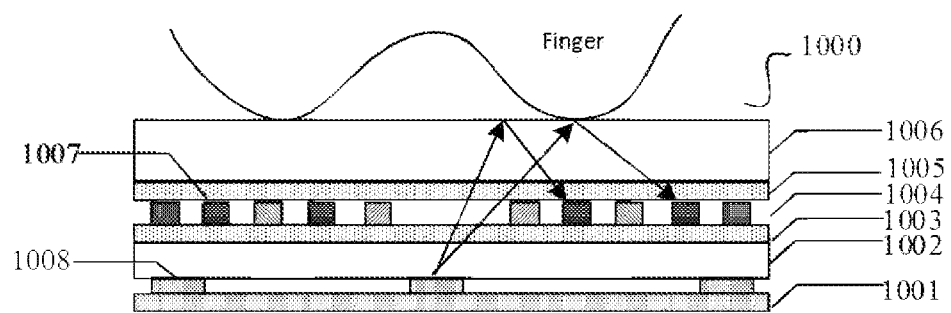
FIGS. 10A-10B show schematic diagrams of organic light-emitting diode (OLED) devices containing fingerprint recognition devices according to embodiments of the present disclosure.
Figure 10B:
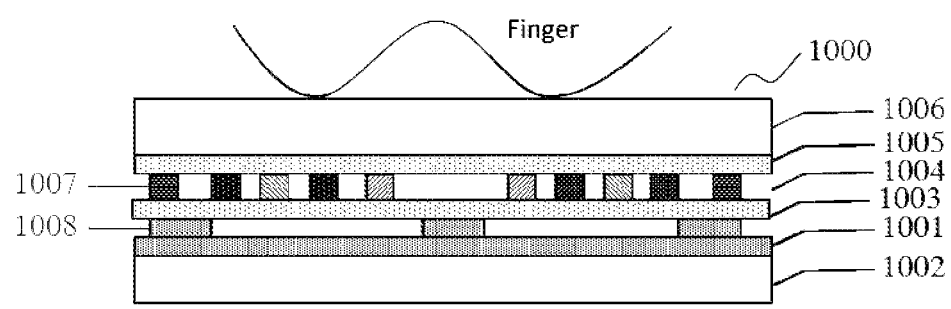

FIGS. 10A-10B show schematic diagrams of organic light-emitting diode (OLED) devices containing fingerprint recognition devices according to embodiments of the present disclosure. As shown in FIGS. 10A and 10B, the OLED device 1000 comprises a point light source layer 1001 comprising at least one point light source 1008, an array substrate 1002, a first electrode 1003, a light emitting layer 1004, a second electrode 1005, and a protective layer 1006, arranged in the stated order. In at least some embodiments, the at least one point light source 1008 is provided on a same side of the array substrate 1002 as the light emitting layer 1004, for example, as shown in FIG. 10B. The OLED device may also comprise a touch layer, a polarizing layer, an encapsulation layer, an optical adhesive layer, and any other components known to a person of ordinary skill in the art to be suitable for an OLED device. The light emitting layer 1004 comprises a light sensor 1007, Light emitted by the at least one point light source 1008 in the point light source layer 1001 is transmitted through the array substrate 1002, the first electrode 1003, the light emitting layer 1004, the second electrode 1005, and the protective layer 1006 to reach the touch surface, that is, between the user's finger and the protective layer 1006. Lights reflected and scattered at the touch surface travel back through the protective layer 1006 and the second electrode 1005 to reach the light sensor 1007 in the light emitting layer 1004. The light sensor 1007 is configured to receive the reflected light and convert the light signals into electrical signals through photoelectric conversion, so as to generate an image of the user's fingerprint. In at least some embodiments, a light shielding layer is provided on a side of the light sensor 1007 facing the at least one point light source 1008. The light shielding layer is configured to prevent interference with the light sensor 1007 due to the at least one point light source 1008.

The present disclosure also provides an in-display, full-screen fingerprint recognition method using a fingerprint recognition device described above. The method comprises receiving a light emitted by at least one point light source, generating a signal based on the received light, and generating fingerprint information based on the signal.

In at least some embodiments, the fingerprint recognition device 400 comprises a plurality of point light sources 402, The plurality of point light sources 402 may be arranged in an array. The array of point light sources may be grouped according to a predetermined pattern of repeating units, and point light sources in repeating units may be configured to illuminate sequentially according to a predetermined order, for example, in a horizontal direction as shown in FIG. 9, a vertical direction, a diagonal direction, and/or any suitable direction of the array.

Figure 11:
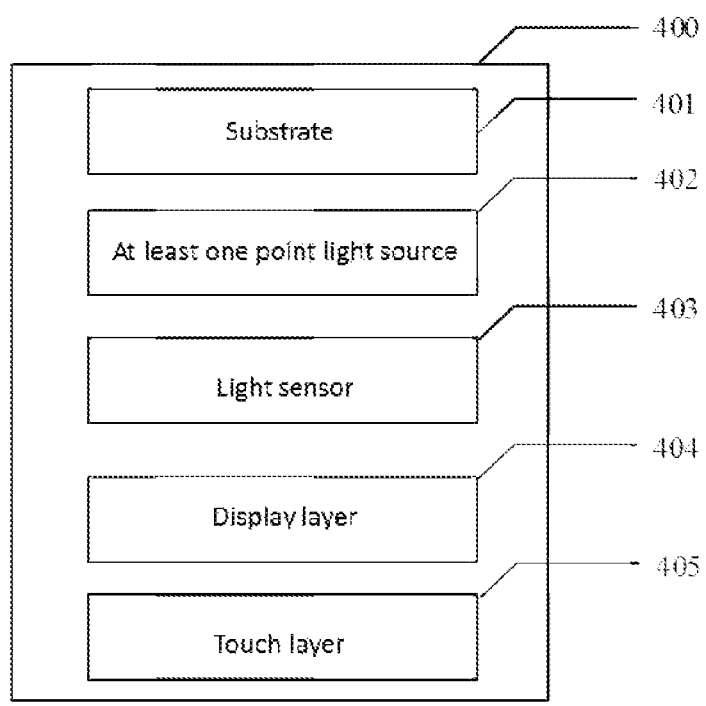
FIGS. 11-12 show schematic diagrams of a fingerprint recognition device according to embodiments of the present disclosure.

FIG. 11 shows a schematic diagram of the components of a fingerprint recognition device according to an embodiment of the present disclosure. As shown in FIG. 11, the fingerprint recognition device may comprise a touch layer 405 that is configured to determine a position of contact. When a contact is detected between the user's finger and the screen of a display device, the touch layer is configured to determine the position of the contact, and to communicate the position of the contact so that no displays are generated in the portion of the display layer 404 corresponding to the position of the contact. It should be understood that FIG. 11 is a schematic diagram of the components of a fingerprint recognition device of the present disclosure, and does not limit the relative arrangement of the components.

Figure 12:
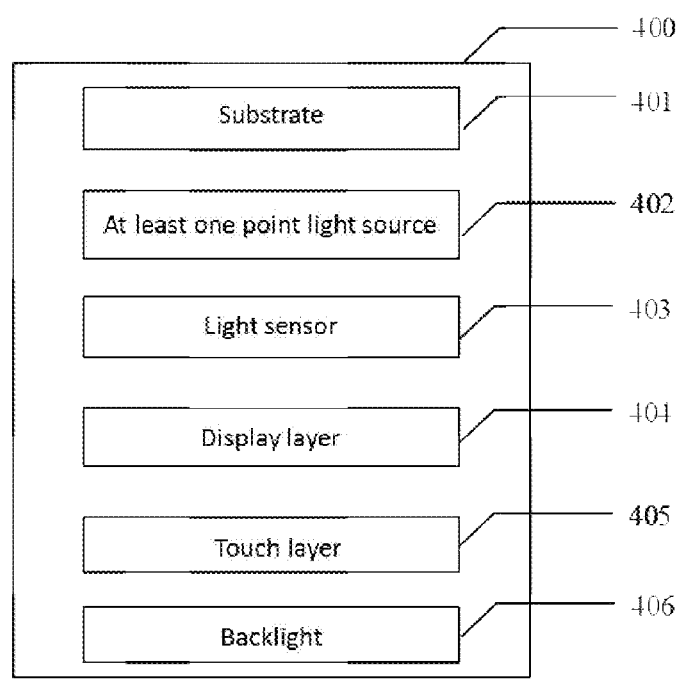

FIG. 12 shows a schematic diagram of the components of a fingerprint recognition device according to an embodiment of the present disclosure. As shown in FIG. 12, the fingerprint recognition device may comprise a touch layer 405 and a backlight 406. The touch layer 405 is configured to determine a position of contact. When a contact is detected between the user's finger and the screen of a display device, the touch layer is configured to determine the position of the contact, and to communicate the position of the contact so that the backlight is turned off at a position corresponding to the position of the contact. It should be understood that FIG. 12 is a schematic diagram of the components of a fingerprint recognition device of the present disclosure, and does not limit the relative arrangement of the components.

The present disclosure makes it possible to increase the speed at which fingerprint information is processed, which can in turn make for more efficient fingerprint recognition. Further, not only can the fingerprint recognition device according to the present disclosure be energy-efficient, and it can also minimize interferences from internal light emissions, so as to improve the accuracy of the fingerprint identification.

Figure 13:
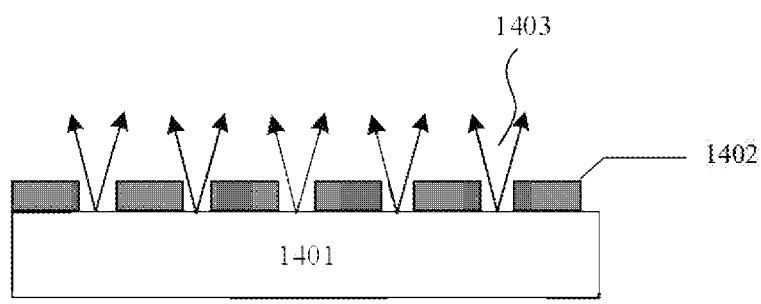
FIGS. 13-15 show schematic diagrams of an array of point light sources according to embodiments of the present disclosure.
Figure 14:
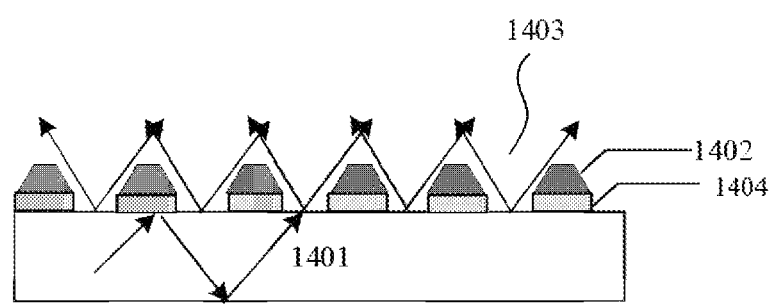
Figure 15:
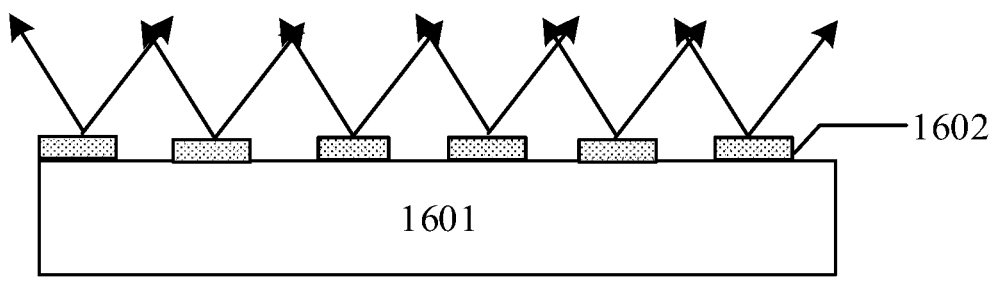

FIGS. 13-15 show schematic diagrams of an array of point t sources according to embodiments of the present disclosure.

In at least some embodiments, a pinhole layer is coated onto a light source, so as to form an array of point light sources. More particularly, as shown in FIG. 13, a pinhole layer 1402 comprising a pinhole array 1403 is provided onto a light source 1401, so that light is forced to pass through the pinholes 1403 and is emitted as an array of point lights. The pinholes 1403 may be tapered, stepped, and the like. The pinholes 1403 may be configured to increase the intensity of the point light at large divergence angles. In at least some embodiments, the pinholes 1403 are tapered. In some embodiments, the maximum diameter in each pinhole is 0.4 mm. A diameter larger than 0.4 mm may interfere with fingerprint recognition. To improve the efficiency of light utilization, the pinholes 1403 may be configured to maximize the amount of light emitted through the pinholes 1403, for example, by coating the pinhole layer 1402 with a reflective coating layer 1404 (as shown in FIG. 14). The reflective coating layer 1404 may comprise a material having a high reflectivity. For example, the reflective coating layer 1404 may be a metal layer comprising a metal such as gold, silver, aluminum, and the like. The reflective coating layer 1404 may be a dielectric layer comprising a low refractive layer and a high refractive layer arranged in an alternating manner. The dielectric layer may be formed according to any suitable means known to a person of ordinary skill in the art, for example, by alternately vapor-depositing a material having a low refractive index and a material having a high refractive index.

In at least some embodiments, a plurality of small-sized light emitting devices may be arranged in an array to form an array of point light sources. For example, as shown in FIG. 15, a plurality of small-sized light emitting devices 1602 are arranged on the substrate 1601 into an array of point light sources. The small-sized light emitting devices may be at least one of OLED, LED, and MicroLED. In some embodiments, each small-sized light emitting device has a circular or substantially circular shape, and a diameter of each small-sized light emitting device is at most 0.4 mm. A diameter larger than 0.4 mm may interfere with fingerprint recognition.

Figure 16:
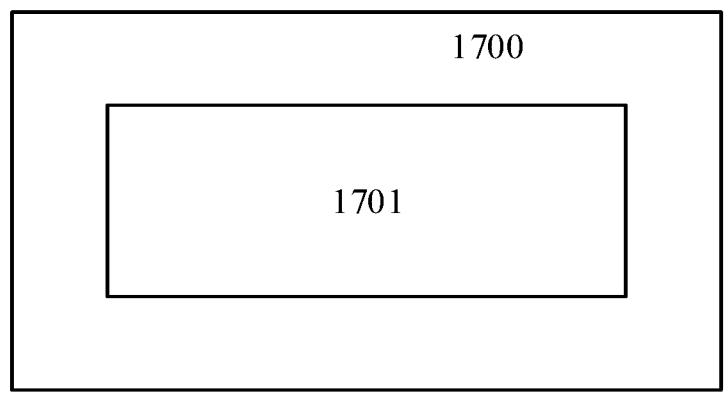
FIG. 16 shows a schematic diagram of a display device according to an embodiment of the present disclosure.

The present disclosure provides a display device comprising a fingerprint recognition device described above. FIG. 16 shows a schematic diagram of a display device according to an embodiment of the present disclosure. As shown in FIG. 16, the display device 1700 comprises a fingerprint recognition device 1701. A fingerprint recognition device according to the present disclosure may be integrated into any display device 1700, including, but not limited to, a mobile phone, a tablet, a television, a computer, a display, a notebook computer, a digital photo frame, a navigation system, and ally other products or components that provide a display function.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A fingerprint recognition device, comprising:
   a substrate;
   a plurality of point light sources on the substrate, which are configured to emit light;
   a plurality of light sensors on the substrate, which are configured to generate an electrical signal based on the light emitted from the plurality of point light sources and reflected from a touch surface; and
   a display layer on the plurality of light sensors,
   wherein a distance between a pair of adjacent point light sources satisfies a relationship defined by formula (1):

$$p \leq \frac{d \tan \theta_1}{\sqrt{2}}, \quad (1)$$

in which p is the distance between the pair of adjacent point light sources, d is the distance between a first of the pair of point light sources and the touch surface, and θ1 is the maximum divergence angle of light that is emitted by the first of the pair of point light sources and that is detectable by one of the plurality of light sensors.

2. The device according to claim 1, wherein the plurality of point light sources and the plurality of light sensors are on opposite sides of the substrate, with the plurality of light sensors being on a display side of the substrate.

3. The device according to claim 1, wherein the plurality of point light sources and the plurality of light sensors are on a display side of the substrate.

4. The device according to claim 1, further comprising a light shielding layer on a side of the plurality of the light sensor facing the plurality of point light sources.

5. The device according to claim 1, wherein the plurality of point light sources are arranged in an array.

6. The device according to claim 5, wherein the plurality of point light sources are configured to illuminate according to a predetermined illumination sequence.

7. The device according to claim 1, wherein:
   each of the plurality of point light sources comprises a light source and a pinhole layer on the light source, and
   the pinhole layer comprises a pinhole array.

8. The device according to claim 7, wherein each pinhole in the pinhole array is tapered.

9. The device according to claim 7, wherein:
   the pinhole layer comprises a reflective coating layer; and
   the reflective coating layer is at least one selected from (i) a metal layer comprising a metal having a high reflectivity and (ii) a dielectric layer comprising a low refractive layer and a high refractive layer arranged in an alternating manner.

10. The device according to claim 1, wherein:
    each of the plurality of point light sources comprises a plurality of light emitting devices arranged in an array, and
    each of the plurality of light emitting devices is one selected from the group consisting of OLED, LED, and MicroLED.

11. A display device comprising the fingerprint recognition device according to claim 1.

12. A method of operating the fingerprint recognition device according to claim 1 to recognize fingerprint, the method comprising:
    detecting a contact by a user on the touch surface,
    causing the plurality of point light sources to emit a light toward the touch surface at a position of the contact,
    detecting a light reflected from the touch surface at the position of the contact, and
    generating an image of the fingerprint of the user based on the detected light.

13. The method according to claim 12, further comprising turning off a backlight at the position of the contact.

14. The method according to claim 12, further comprising turning off a display in the portion of the display layer corresponding to the position of the contact.

15. A fingerprint recognition device, comprising:
    a substrate;
    a plurality of point light sources on the substrate, which are configured to emit light;
    a plurality of light sensors on the substrate, which are configured to generate an electrical signal based on the light emitted from the plurality of point light sources and reflected from a touch surface;
    a display layer on the plurality of light sensors; and
    a touch layer on the display layer,
    wherein the touch layer is configured to determine a position of contact between a finger of the user and the touch surface, and when a contact is detected, the touch layer is configured to determine the position of the contact, so that a display is not generated in a portion of the display layer corresponding to the position of the contact.

16. A fingerprint recognition device, comprising:
    a substrate;
    a plurality of point light sources on the substrate, which are configured to emit light;
    a plurality of light sensors on the substrate, which are configured to generate an electrical signal based on the light emitted from the plurality of point light sources and reflected from a touch surface;
    a display layer on the plurality of light sensors;
    a touch layer on the light sensor; and
    a backlight on the touch layer,
    wherein the touch layer is configured to determine a position of contact between a finger of the user and the touch surface, and when a contact is detected, the touch layer is configured to determine the position of the contact, so that the backlight is turned off at the position of the contact.

17. An organic light-emitting diode (OLED) device for fingerprint recognition, comprising:
    a point light source layer comprising a plurality point light sources configured to emit light,
    an array substrate, a first electrode,
    a light emitting layer,
    a second electrode, and
    a protective layer,
    arranged in the stated order,
    wherein the light emitting layer comprises a plurality of light sensors configured to generate an electric signal based on the light emitted from the plurality of point light sources and reflected from a touch surface of the OLED device, and
    wherein a distance between a pair of adjacent point light sources satisfies a relationship defined by formula (1):

$$p \le \frac{d\tan\theta_1}{\sqrt{2}}, \quad (1)$$

in which p is the distance between the pair of adjacent point light sources, d is the distance between a first of the pair of point light sources and the touch surface, and θ1 is the maximum divergence angle of light that is emitted by the first of the pair of point light sources and that is detectable by one of the plurality of light sensors.

18. A display device comprising the OLED device according to claim 17.

\* \* \* \* \*